United States Patent
Warner et al.

(10) Patent No.: US 10,843,620 B2
(45) Date of Patent: Nov. 24, 2020

(54) AUTOMOTIVE LIGHTING WITH VARIABLE CONTROLLED ACTUATORS

(71) Applicant: Valeo North America, Inc., Troy, MI (US)

(72) Inventors: Gavin Warner, Seymour, IN (US); Greg Simons, Seymour, IN (US); Julien Hemon, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 16/206,490

(22) Filed: Nov. 30, 2018

(65) Prior Publication Data

US 2020/0171999 A1 Jun. 4, 2020

(51) Int. Cl.
| | |
|---|---|
| *B60Q 1/076* | (2006.01) |
| *B60Q 1/14* | (2006.01) |
| *F21S 41/32* | (2018.01) |
| *F21S 41/62* | (2018.01) |
| *F21S 41/255* | (2018.01) |

(52) U.S. Cl.
CPC .......... *B60Q 1/076* (2013.01); *B60Q 1/1423* (2013.01); *F21S 41/255* (2018.01); *F21S 41/321* (2018.01); *F21S 41/62* (2018.01); *B60Q 2300/112* (2013.01)

(58) Field of Classification Search
CPC .................................................. B60Q 1/076
See application file for complete search history.

(56) References Cited

U.S. PATENT DOCUMENTS

| | | | | |
|---|---|---|---|---|
| 5,877,680 | A * | 3/1999 | Okuchi | B60Q 1/115 315/82 |
| 5,938,319 | A | 8/1999 | Hege | |
| 6,183,118 | B1 * | 2/2001 | Toda | B60Q 1/115 315/360 |
| 6,325,528 | B1 | 12/2001 | Wttmeier et al. | |
| 6,450,673 | B1 * | 9/2002 | Toda | B60Q 1/115 362/464 |
| 6,504,265 | B2 * | 1/2003 | Toda | B60Q 1/115 307/10.8 |
| 6,626,565 | B2 * | 9/2003 | Ishida | F21S 41/675 362/514 |

(Continued)

FOREIGN PATENT DOCUMENTS

| | | |
|---|---|---|
| DE | 102006018667 A1 | 10/2007 |
| WO | 0050260 A2 | 8/2000 |

*Primary Examiner* — Evan P Dzierzynski
*Assistant Examiner* — Keith G. Delahoussaye
(74) *Attorney, Agent, or Firm* — Valeo North America, Inc.

(57) ABSTRACT

In an automotive lighting apparatus, at least one lighting component generates a corresponding light field. The lighting component is aligned such that the light field conforms to an illumination profile having a cutoff region meeting a cutoff criterion. At least one actuator is mechanically coupled to the lighting component to aim the lighting component in a direction other than that in which the lighting component was aligned. A control component operates the actuator based on the speed of an automobile in which the lighting component is installed. The actuator is then configured to aim the lighting component in the direction other than that in which the lighting component was aligned so that the light field thereof conforms to another illumination profile meeting another cutoff criterion.

9 Claims, 16 Drawing Sheets

(56) References Cited

U.S. PATENT DOCUMENTS

| | | | |
|---|---|---|---|
| 2003/0072164 A1* | 4/2003 | Watanabe | B60Q 1/10 362/465 |
| 2003/0107898 A1* | 6/2003 | Smith | B60Q 1/10 362/465 |
| 2003/0174493 A1* | 9/2003 | Kinouchi | B60Q 1/12 362/43 |
| 2006/0039158 A1 | 2/2006 | Kurz et al. | |
| 2007/0195543 A1* | 8/2007 | Sugimoto | B60Q 1/0094 362/509 |
| 2011/0280028 A1* | 11/2011 | Uchida | F21S 41/321 362/516 |
| 2013/0223089 A1* | 8/2013 | Danner | F21S 41/143 362/511 |

* cited by examiner

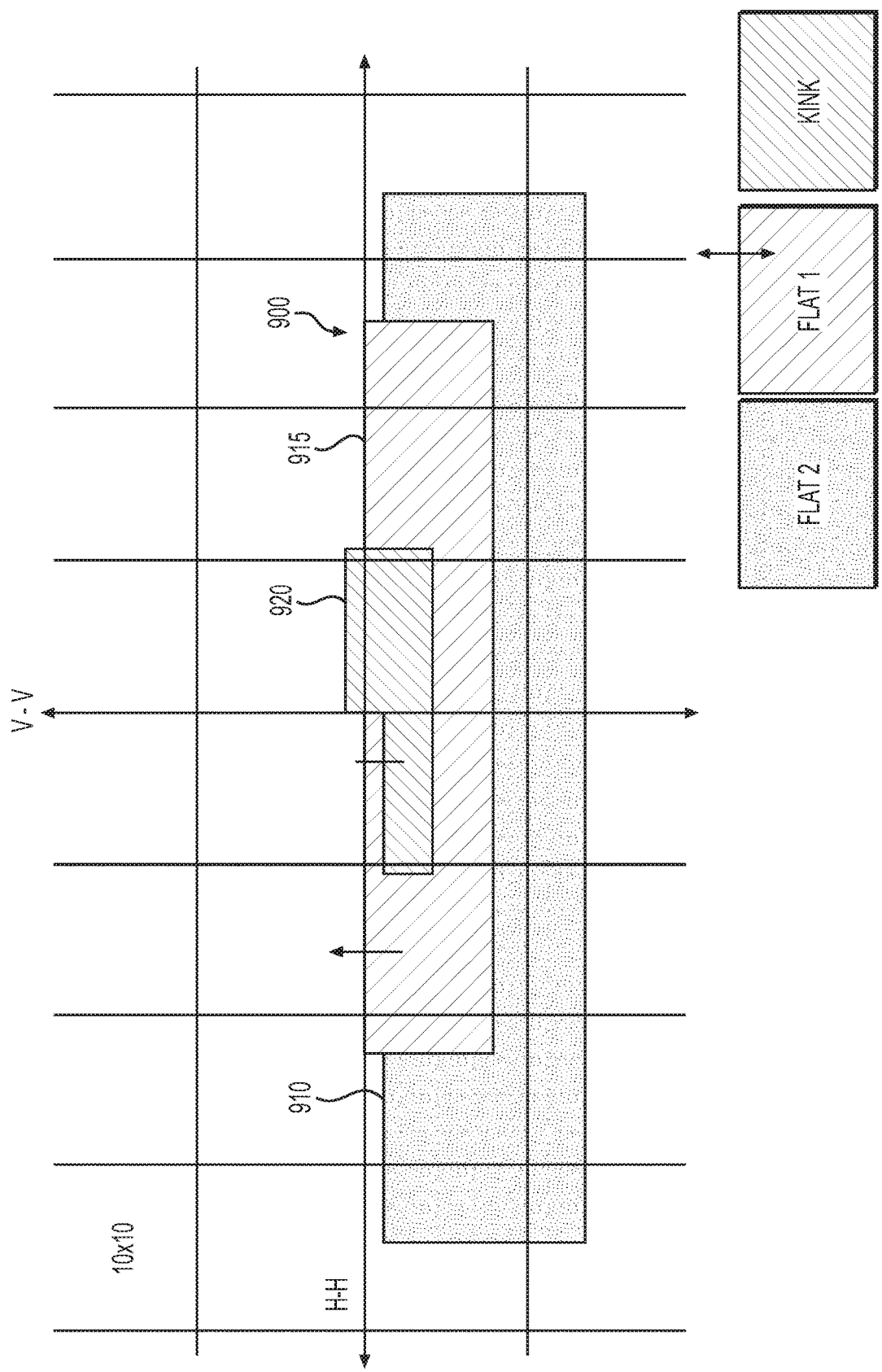

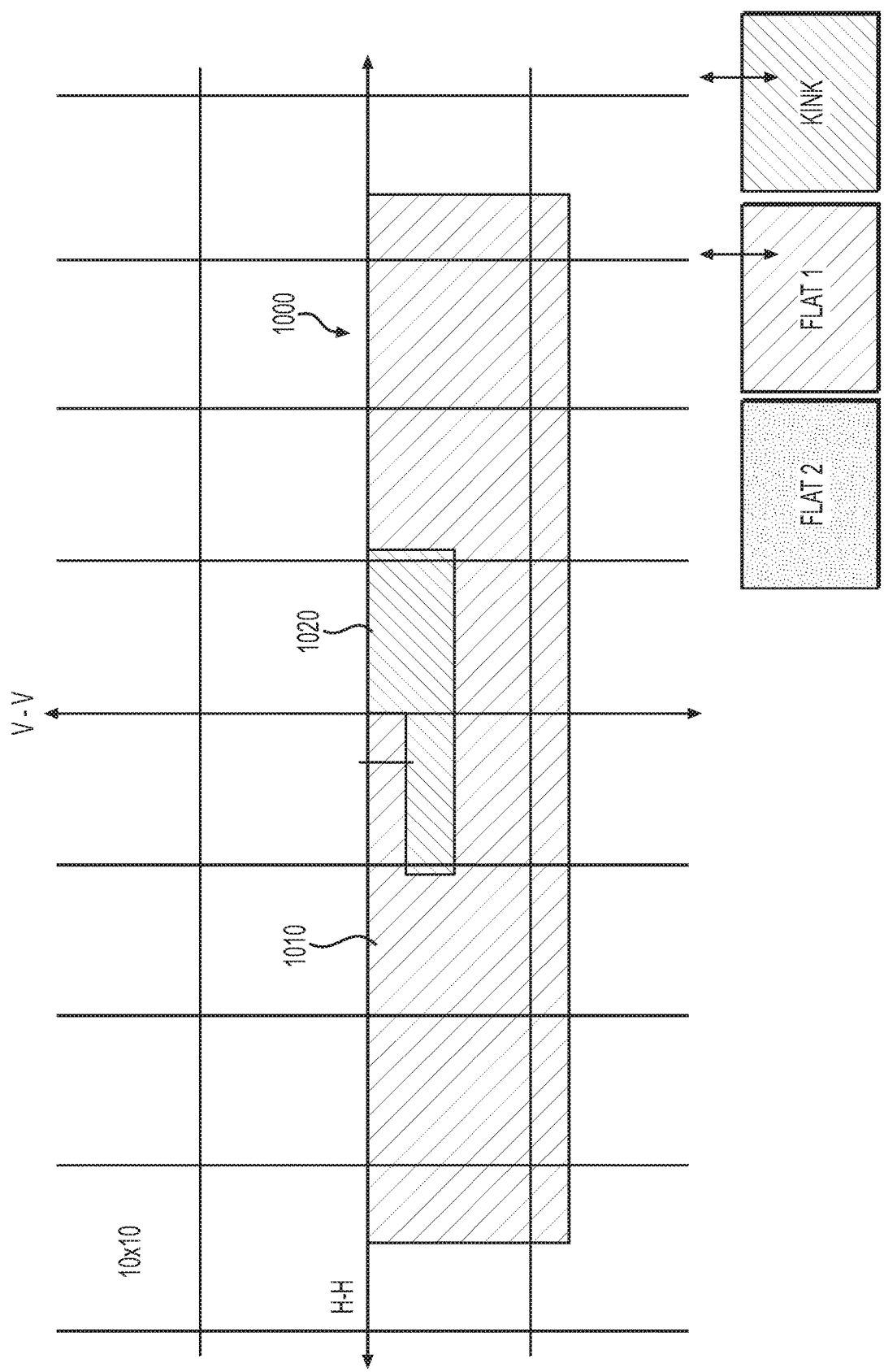

AUTOMOTIVE LIGHTING WITH VARIABLE CONTROLLED ACTUATORS

BACKGROUND

Modern motor vehicles are equipped with a wide array of illumination devices that illuminate the exterior and interior of the vehicle. For example, exterior vehicle lighting devices perform stop lamp functions, tail lamp functions, headlamp functions, running light functions, dynamic bending light functions and fog lamp functions. Numerous studies have found that nighttime visibility is a key to highway safety.

To improve roadway safety, governments and other entities promulgate some form of safety regulations that specify motor vehicle lighting requirements. Such regulations help to ensure adequate illumination of the roadway and visibility of motor vehicles on the road so that their presence is apparent and their signals are understood in daylight, in darkness and in conditions of reduced visibility.

Most states, countries or regions which utilize motor vehicles have various requirements and standards that a vehicle must adhere to in order to legally use roadways within its jurisdiction. In the United States, Federal Motor Vehicle Safety Standard (FMVSS) No. 108 specifies various maximum and minimum photometric intensity values (based on angle) for headlamps of vehicles operated on its roadways. In addition to these requirements, the Insurance Institute for Highway Safety (IIHS) in the United States has its own set of tests and ratings (Headlight Test and Rating Protocol) for headlamp performance. The IIHS tests and ratings seek to encourage manufacturers to improve the illumination performance in actual on-road use. IIHS evaluations have shown that the on-road illumination provided by vehicle headlamps varies widely. In addition, IIHS has rated the majority of headlamps in a poor category (e.g., insufficient illumination, excessive glare, etc.).

The foregoing BACKGROUND section is provided for the purpose of generally presenting the context of the disclosure. Work of the presently named inventors, to the extent it is described in the BACKGROUND section, as well as aspects of the description which may not otherwise qualify as prior art at the time of filing, are neither expressly nor impliedly admitted as prior art against the present disclosure.

SUMMARY

In an automotive lighting apparatus, at least one lighting component generates a corresponding light field. The lighting component is aligned such that the light field conforms to an illumination profile having a cutoff region meeting a cutoff criterion. At least one actuator is mechanically coupled to the lighting component to aim the lighting component in a direction other than that in which the lighting component was aligned. A control component operates the actuator based on the speed of an automobile in which the lighting component is installed. The actuator is then configured to aim the lighting component in the direction other than that in which the lighting component was aligned so that the light field thereof conforms to another illumination profile meeting another cutoff criterion.

BRIEF DESCRIPTION OF THE DRAWINGS

FIGS. 9A-9B are diagrams of exemplary light fields of a low beam headlamp according to embodiments of the present inventive concept.

FIGS. 10A-10B are diagrams of exemplary light fields of a low beam headlamp according to embodiments of the present inventive concept.

DETAILED DESCRIPTION

Figure 1:
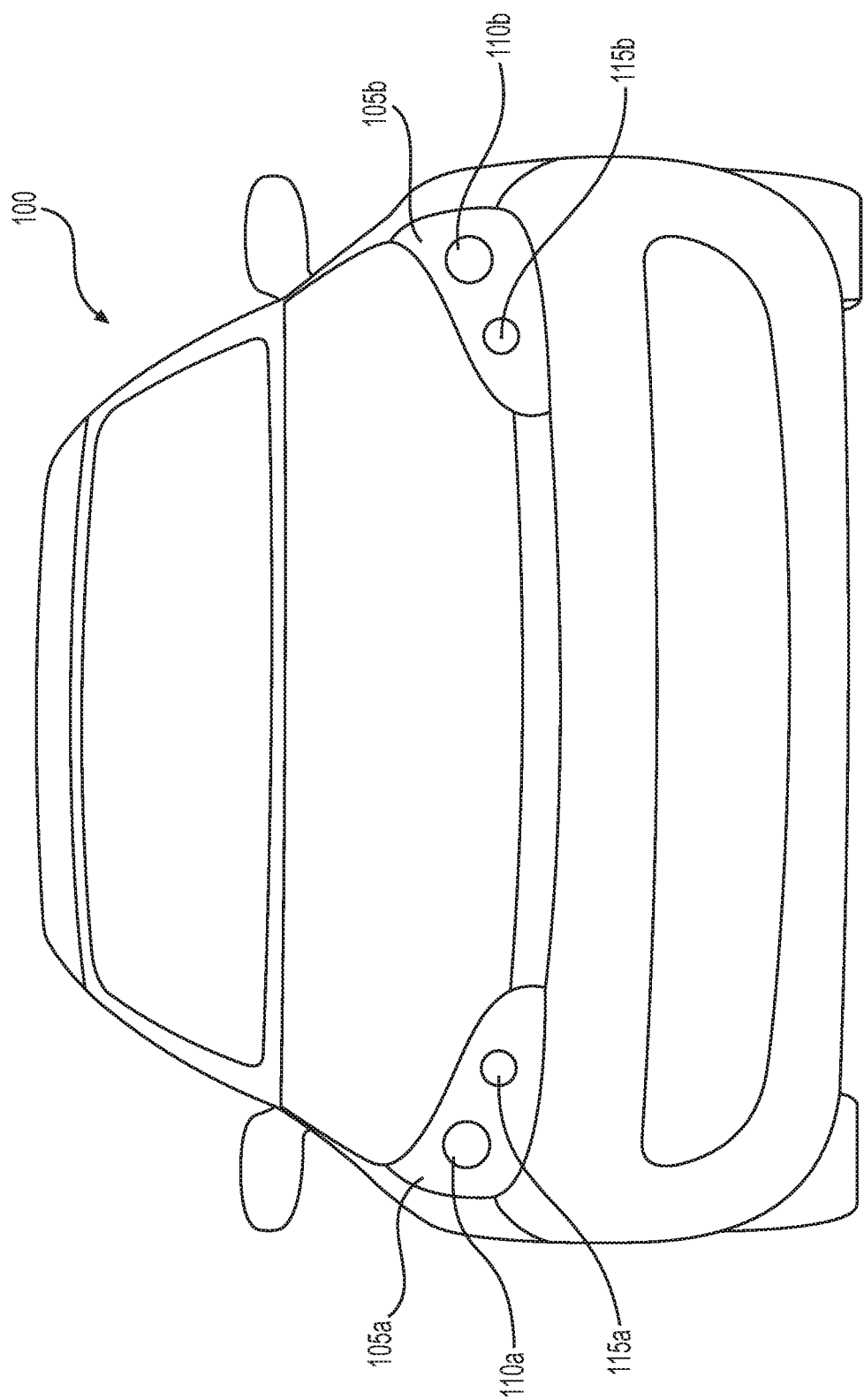
FIG. 1 is an illustration of an exemplary motor vehicle in which the present inventive concept can be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

In the interest of conciseness and overall clarity, not all implementation details of the embodiments described herein are shown and described. It will be appreciated that in the development of any such actual implementation, numerous implementation-specific decisions will be made in order to achieve the developer's specific goals, such as compliance with application- and business-related constraints, and that these specific goals will vary from one implementation to another and from one developer to another.

FIG. 1 illustrates a front-end of an exemplary motor vehicle 100. Motor vehicle 100 includes two lamp assemblies 105a and 105b, representatively referred to herein as lamp assembly(-ies) 105. Lamp assemblies 105 include low beam headlamps 110a and 110b, representatively referred to herein as low beam headlamp(s) 110, and high beam headlamps 115a and 115b, representatively referred to herein as high beam headlamp(s) 115. Low beam aspects may also be referred to as lower or dipped beam aspects and high beam aspects may also be referred to as main or driving beam aspects. Typically, the low beam headlamps 110 are used whenever another vehicle is on the road directly ahead of motor vehicle 100 and/or whenever another vehicle is approaching motor vehicle 100 from an opposite direction.

It is to be understood that while motor vehicle 100 is illustrated as a passenger automobile, the present invention is not so limited. Other motor vehicles including motorcycles, buses, trucks of all sizes, etc. may embody the present invention, as will be apparent to the skilled artisan upon review of this disclosure.

Figure 2:
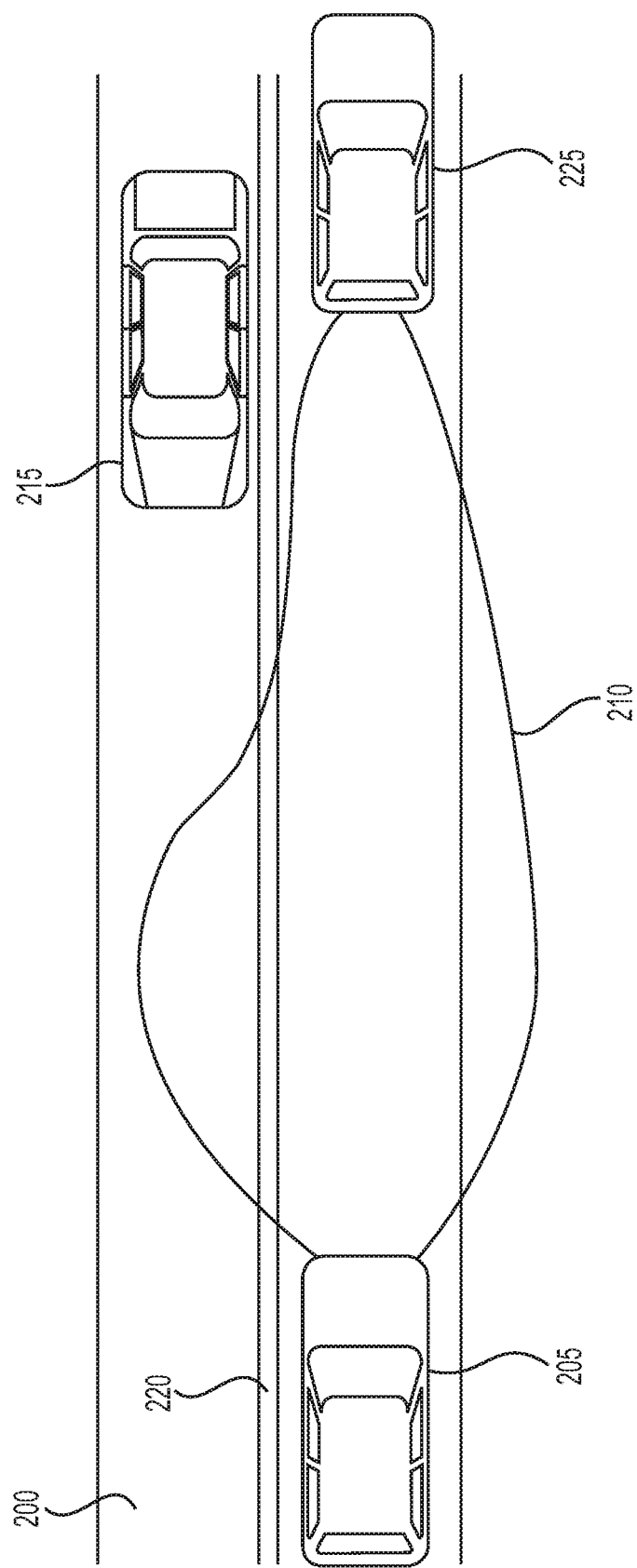
FIG. 2 is a schematic diagram of an exemplary roadway with motor vehicles travelling thereon that embody the present inventive concept.

FIG. 2 is a schematic diagram of an exemplary roadway 200, motor vehicle 205 and a light distribution pattern 210 for low beam headlamps of motor vehicle 205. Light distribution pattern 210 for the low beam headlamps of motor vehicle 205 can be optically designed to minimize the amount of light that crosses the centerline 220 of roadway 200 to reduce dazzle (a blinding effect from the headlights) to a driver of an oncoming motor vehicle 215. Additionally, a range of the low beam headlamps of motor vehicle 205 can be limited to reduce dazzle in the rear-view mirror for a driver of motor vehicle 225 directly ahead of motor vehicle 205 driving in the same direction.

Figure 3:
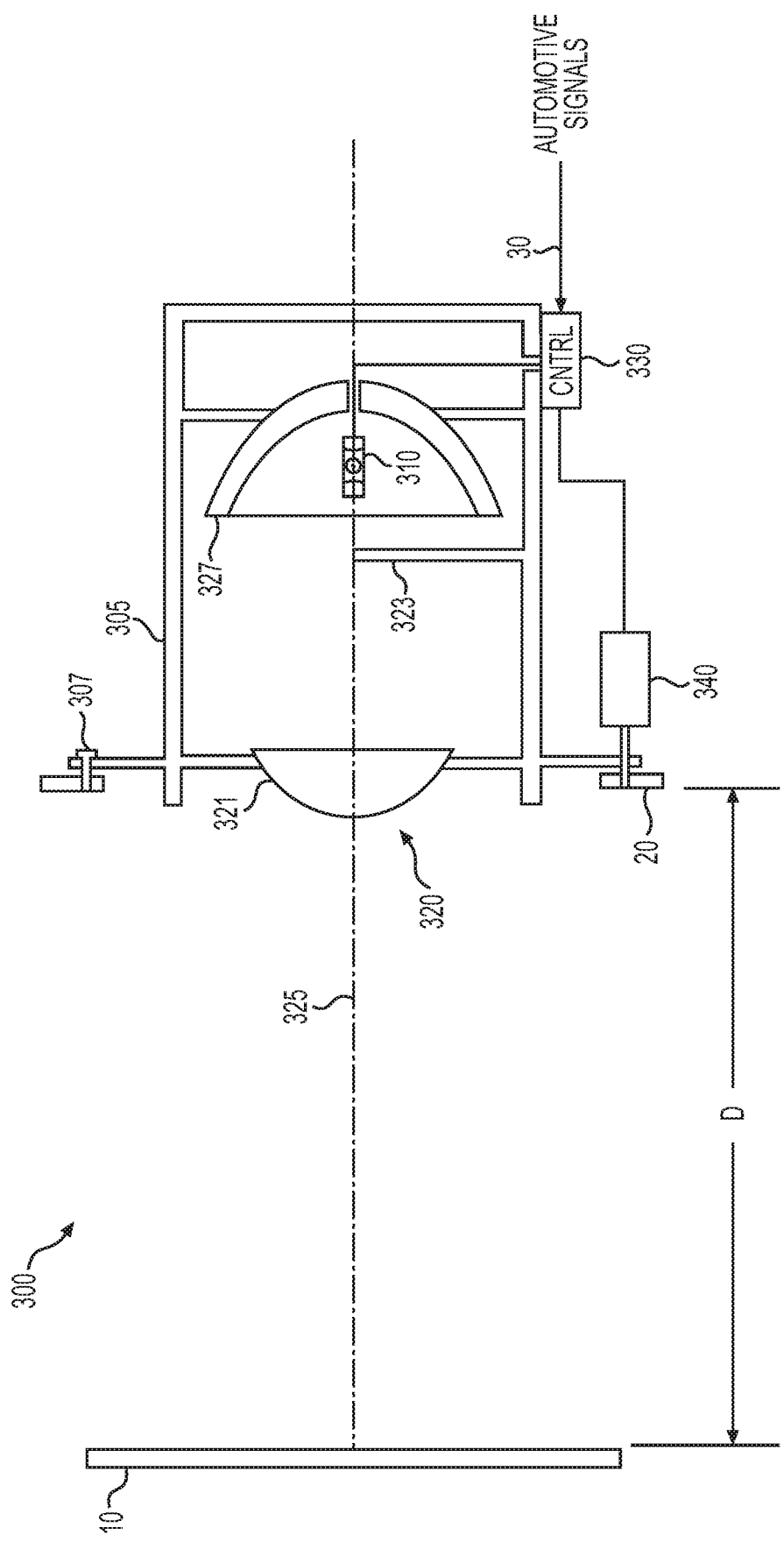
FIG. 3 is a schematic diagram, in cross section, of an exemplary lighting component in which the present inventive concept can be embodied.

FIG. 3 is a schematic diagram, in cross section, of an exemplary lighting component 300 in which the present invention can be embodied. A lighting component fulfilling the principles of lighting component 300 may be utilized in low beam headlamps 110 of FIG. 1. Generally, lighting component 300 comprises a chassis, such as enclosure 305, at least one light source, such as lamp 310, at least one optical system 320 mounted in enclosure 305, a controller 330 and at least one actuator, such as a motor 340. Optical system 320 may include various optical components including refractive elements, e.g., lens 321, reflective elements, e.g., reflector 327, various apertures, irises, filters, etc., e.g., cutoff shield 323, to form a particular illumination profile when evaluated on a screen 10 a distance D from the lighting component 300. The illumination profile, when lighting component 300 is properly aligned relative to the vehicle in which it is mounted (the vehicle is representatively illustrated at lighting mount 20), must have certain characteristics, such as light cutoff criteria in order to meet certain regional requirements, which may vary from region to region.

Lighting component 300 may include a static aiming mechanism, e.g., adjustment screw 307 and a dynamic aiming mechanism, e.g., motor 340. As used herein, static aiming is that conventional alignment performed while the vehicle is motionless and positioned according to predetermined alignment criteria and procedures, such as parked a certain distance D from screen 10. Adjustment screw 307 may be actuated to move lighting component 300 vertically and/or horizontally relative to the vehicle in which it is mounted. Those having skill in headlamp alignment will appreciate different procedures by which lighting component 300 can be statically aimed. It is to be understood that while only a single adjustment screw 307 is illustrated in FIG. 3, lighting component 300 may include multiple such screws and/or other mechanisms by which lighting component 300 is statically aimed.

As used herein, dynamic aiming refers to aiming of lighting component 300 while the vehicle is in motion. For example, in response to a command from controller 330, such as might be issued when the speed of the vehicle exceeds a vehicle speed threshold, motor 340 may engage chassis 305 against vehicle mount 20 to rotate the lighting component 300 a predetermined angle from a previous position. Such command may be issued in response to information provided by the vehicle, such as might be conveyed in automotive signals 30. For example, automotive signals 30 may indicate the speed at which the vehicle is moving, whether high beams or low beams have been activated, etc. Controller 330 may take appropriate action, such as compelling dynamic aiming, based on the information contained or otherwise indicated in automotive signals 30.

Mechanisms other than those illustrated and described with reference to FIG. 3 may be used in embodiments of the present invention to statically and dynamically aim lighting component 300. Those having skill in the automotive lighting arts will recognize numerous adjustment and aiming techniques that can be used in embodiments of the present invention without departing from the spirit and intended scope thereof.

Figure 4A:
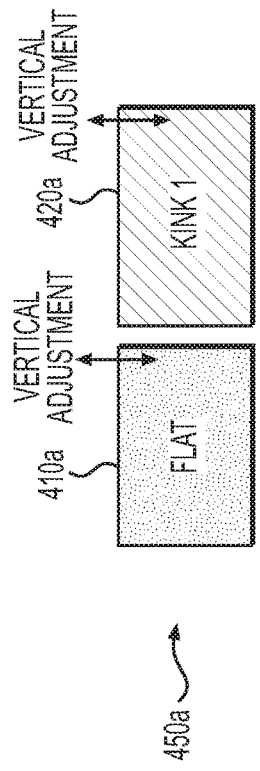
FIGS. 4A-4C are diagrams illustrating lighting configurations in which the present inventive concept can be embodied.
Figure 4B:
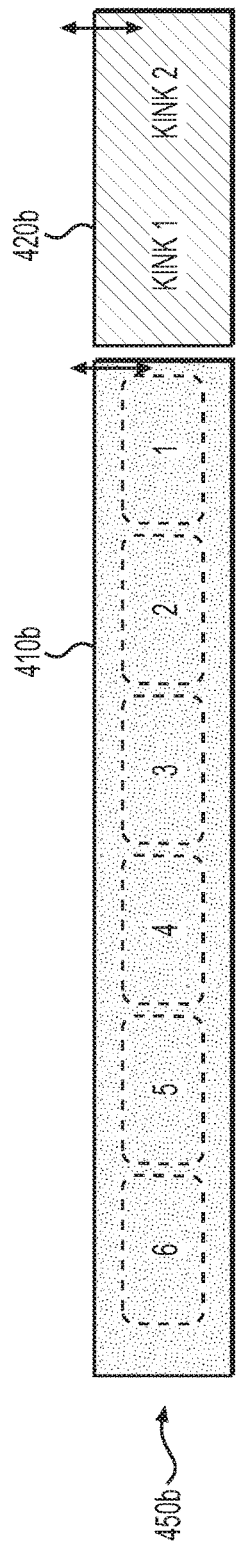
Figure 4C:
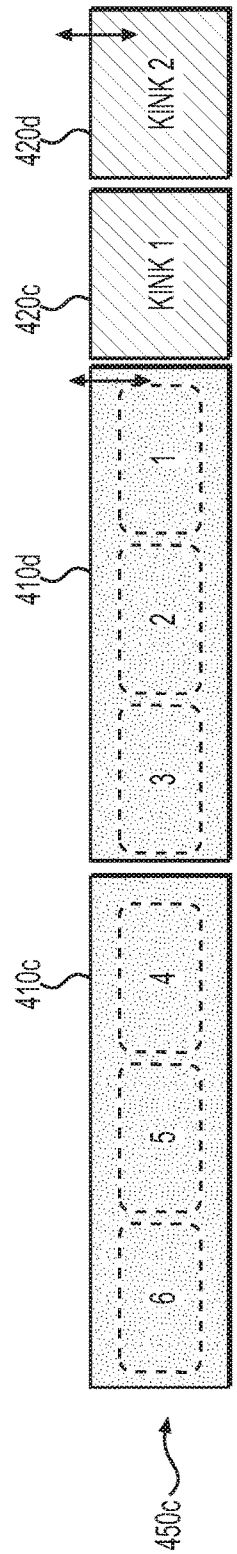

FIGS. 4A-4C are diagrams illustrating lighting configurations in which the present invention can be embodied. In the example embodiments, the lighting configurations include both flat lighting components 410a-410d, representatively referred to herein as flat component(s) 410, and kink lighting components 420a-420d, representatively referred to herein as kink component(s) 420. Flat components 410 may produce a beam having a flat cutoff and kink components 420 may produce a beam having a cutoff that has a step or angled portion to the right of the headlamps centerline. However, the present invention is not limited to these illumination configurations. Indeed, the present invention may incorporate many different lighting components that produce illumination profiles other than those described herein.

In FIG. 4A, low beam headlamp 450a comprises one flat component 410a and one kink component 420a. In FIG. 4B, low beam headlamp 450b comprises one multi-segment flat component 410b and a multi-segment kink component 420b. In FIG. 4C, low beam headlamp 450c comprises multiple multi-segment flat components 410c and 410d and multiple kink components 420c and 420d. As is illustrated in the figures, certain flat components 410 and certain kink components 420 are displaceable and can be moved by command to alter distribution of light in the overall light field of the corresponding beam.

Figure 5:
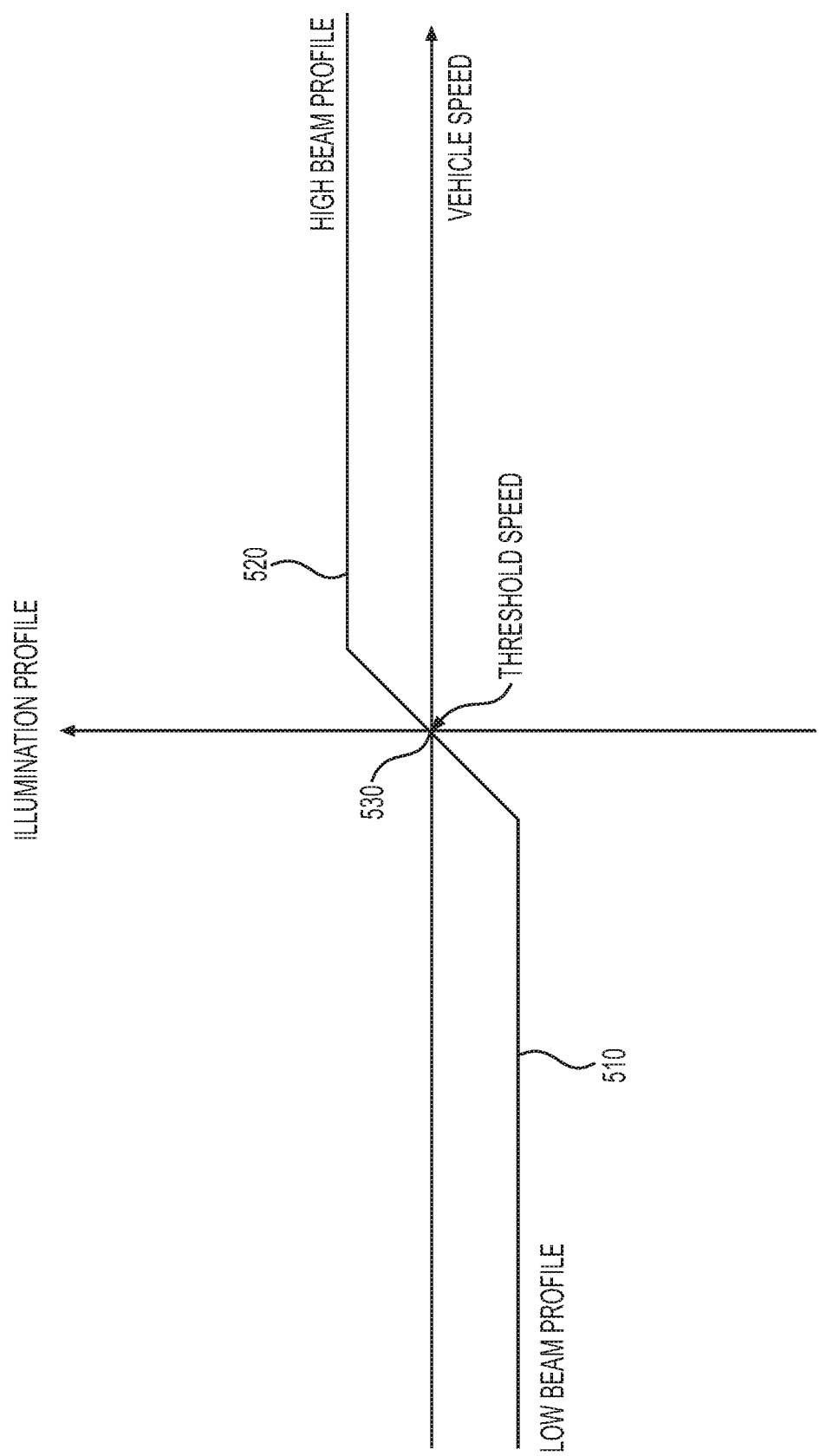
FIG. 5 is a graph of vehicle speed versus illumination profile illustrating a feature of the embodied inventive concept.

FIG. 5 is a graph of vehicle speed versus illumination profile illustrating a feature of the embodied invention. As illustrated in the figure, the light field of a lighting component embodying the present invention conforms to a first illumination profile, e.g., lower beam profile 510, when the vehicle speed is below a threshold speed 530 and conforms to a second illumination profile, e.g., upper beam profile 520, when the vehicle speed is above threshold speed 530. In certain embodiments, threshold speed 530 may be set to 30 miles per hour (MPH)—a vehicle speed under which the IIHS specifies a constraint on the low beam headlamp illumination profile. However, upon review of this disclosure, skilled technicians will recognize that the invention described herein is not limited to a particular threshold speed. Additionally, the transition between illumination profiles, i.e., from lower beam profile to upper beam profile and vice-versa, may be more abrupt than that illustrated in FIG. 5. On the other hand, the transition may be gradual as illustrated in the figure. Indeed, the transition between illumination profiles may proceed along any feasible mechanical motion profile as would be established in a particular headlamp design. Headlamp designers will appreciate the great latitude in choosing a particular motion profile, which may include linear and circular motion, rotation and relative linear motion of components.

The diagrams of FIGS. 6A-10B represent, in simplified form, light fields of contributing lighting components to an overall light field of a low beam headlamp. As will be demonstrated through the figures, the light fields can be moved relative one to another, such as by dynamic aiming, to alter the luminous intensity distribution of the headlamp and thus the light pattern 210 illustrated in FIG. 2. Such movement may be achieved through suitable actuators coupled to flat components 410 and/or kink components 420, as described above.

Figure 6A:
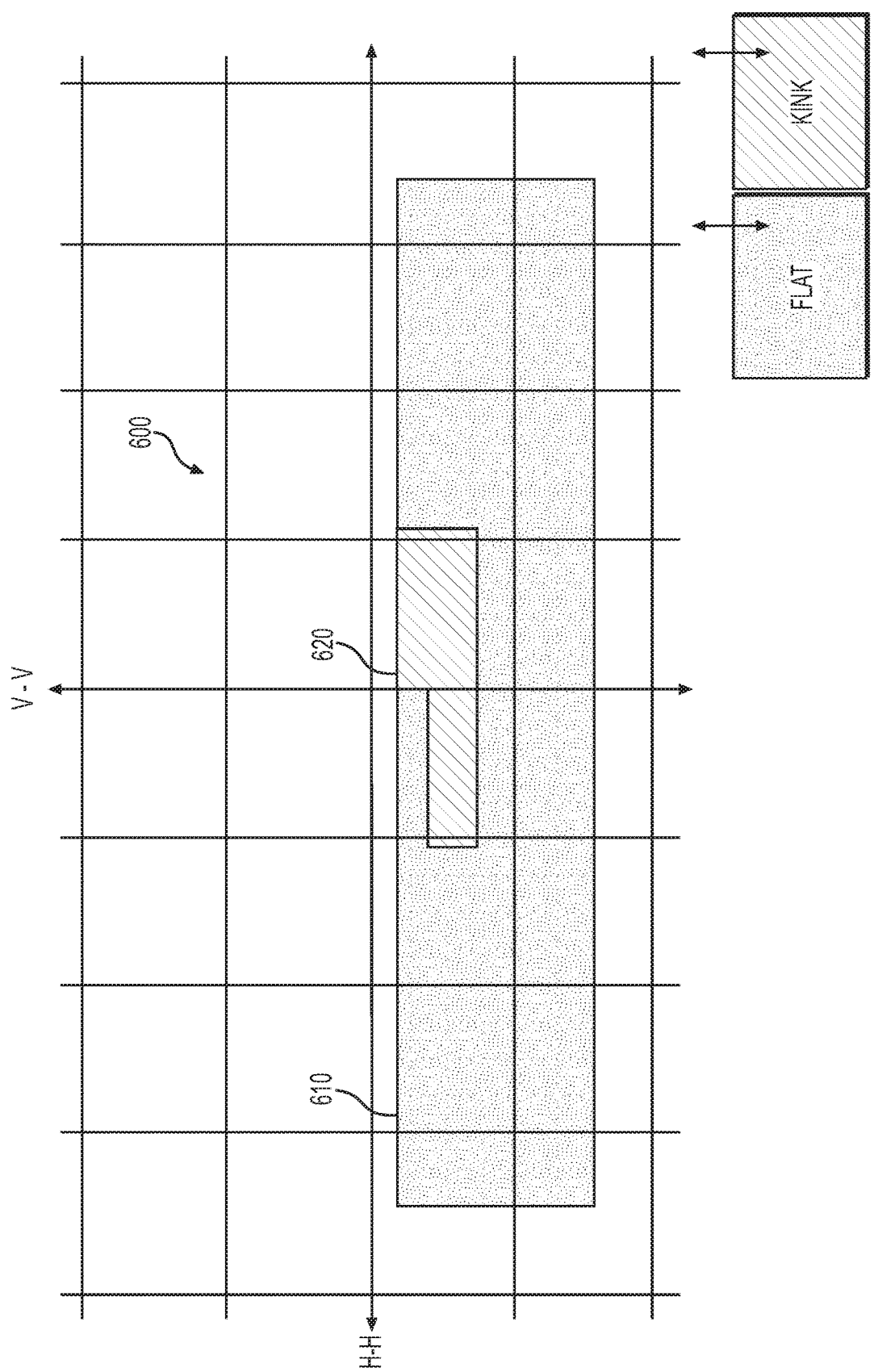
FIGS. 6A-6B are diagrams of exemplary light fields of a low beam headlamp according to embodiments of the present inventive concept.

FIG. 6A illustrates exemplary light fields of a low beam headlamp as seen or measured on a screen spaced apart from, and parallel to, the front (emitting) face of the headlamp. A horizontal axis H and vertical axis V are shown to identify horizontal and vertical planes intersecting both the center of the headlamp, noted as center 325 in FIG. 3, and the screen. In the example illustrated, light field 610 is generated by a flat component and light field 620 is generated by a kink component. The combined light fields 600 are properly aligned on the grid, and hence on the vehicle and conform to a first illumination profile. First illumination profile may be activated when the vehicle in which the headlamp is installed is traveling at a speed less than the vehicle speed threshold.

Figure 6B:
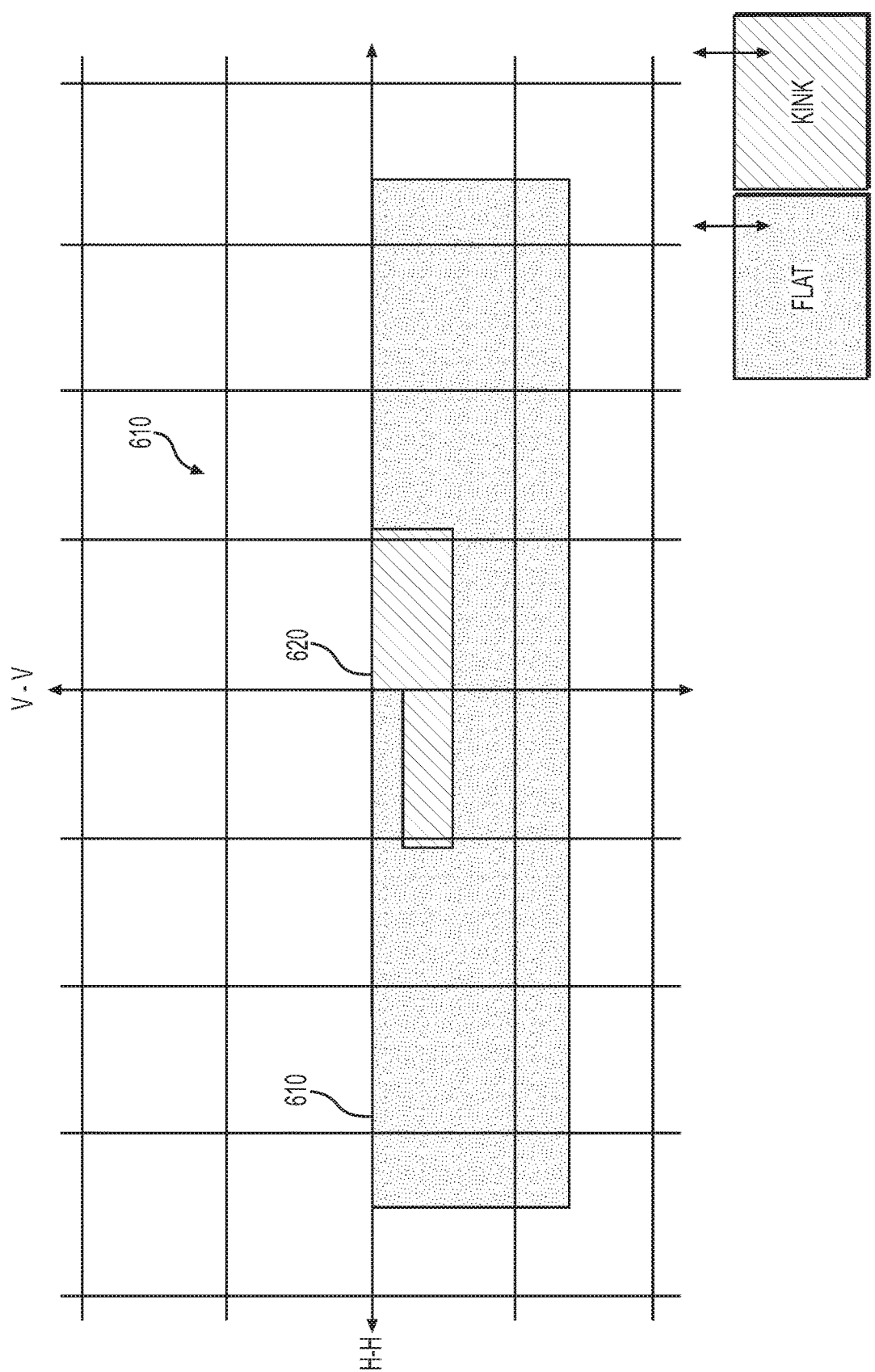

FIG. 6B illustrates the exemplary light fields of the low beam headlamp of FIG. 6A with the light fields redistributed by dynamic aiming, such as for when the vehicle speed exceeds a speed threshold. As illustrated in the figure, both the flat and kink components have been rotated or otherwise displaced to raise combined light field upwards by 0.2°. This increases the forward reach of the low beam headlamp while conforming to IIHS standards. The combined light fields 600 illustrated in FIG. 6B conforms to a second illumination profile, which may be activated when the vehicle in which the headlamp is installed is traveling at a speed greater than the vehicle speed threshold.

Figure 7A:
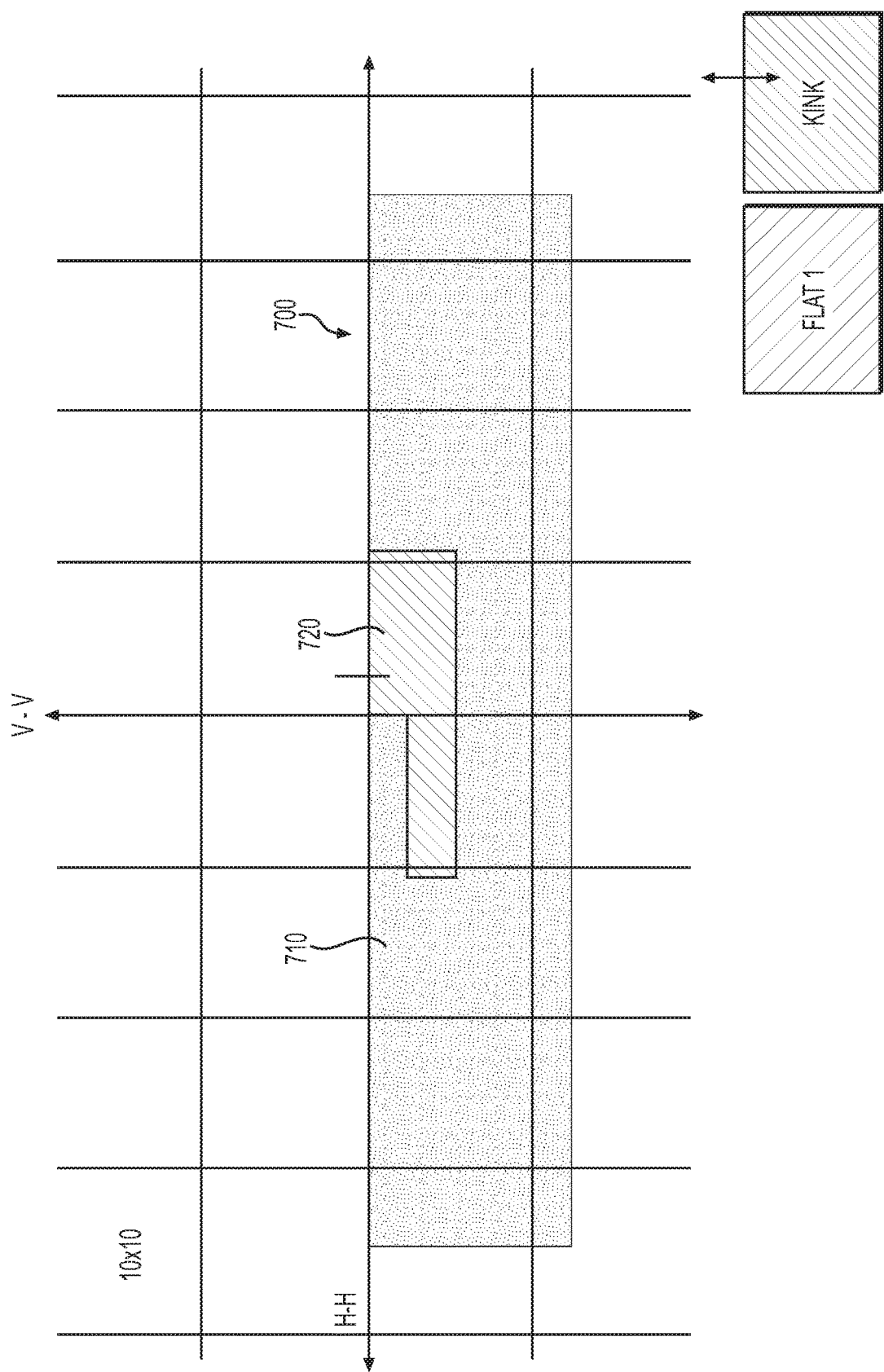
FIGS. 7A-7B are diagrams of exemplary light fields of a low beam headlamp according to embodiments of the present inventive concept.

FIG. 7A illustrates exemplary light fields of a low beam headlamp as seen or measured on the screen described above. In the example illustrated, light field 710 is generated by a flat component and light field 720 is generated by a kink component. The combined light fields are properly aligned on the grid, and hence on the vehicle, in accordance with visually optical right (VOR) alignment criteria (a VOR headlamp has a cutoff in the beam pattern located 1°-3° right of the headlamp vertical axis and on the horizontal axis of the headlamp). The combined light field 700 illustrated in FIG. 7A conforms to a first illumination profile, such as might be activated when a vehicle in which the headlamp is installed is less than a vehicle speed threshold.

Figure 7B:
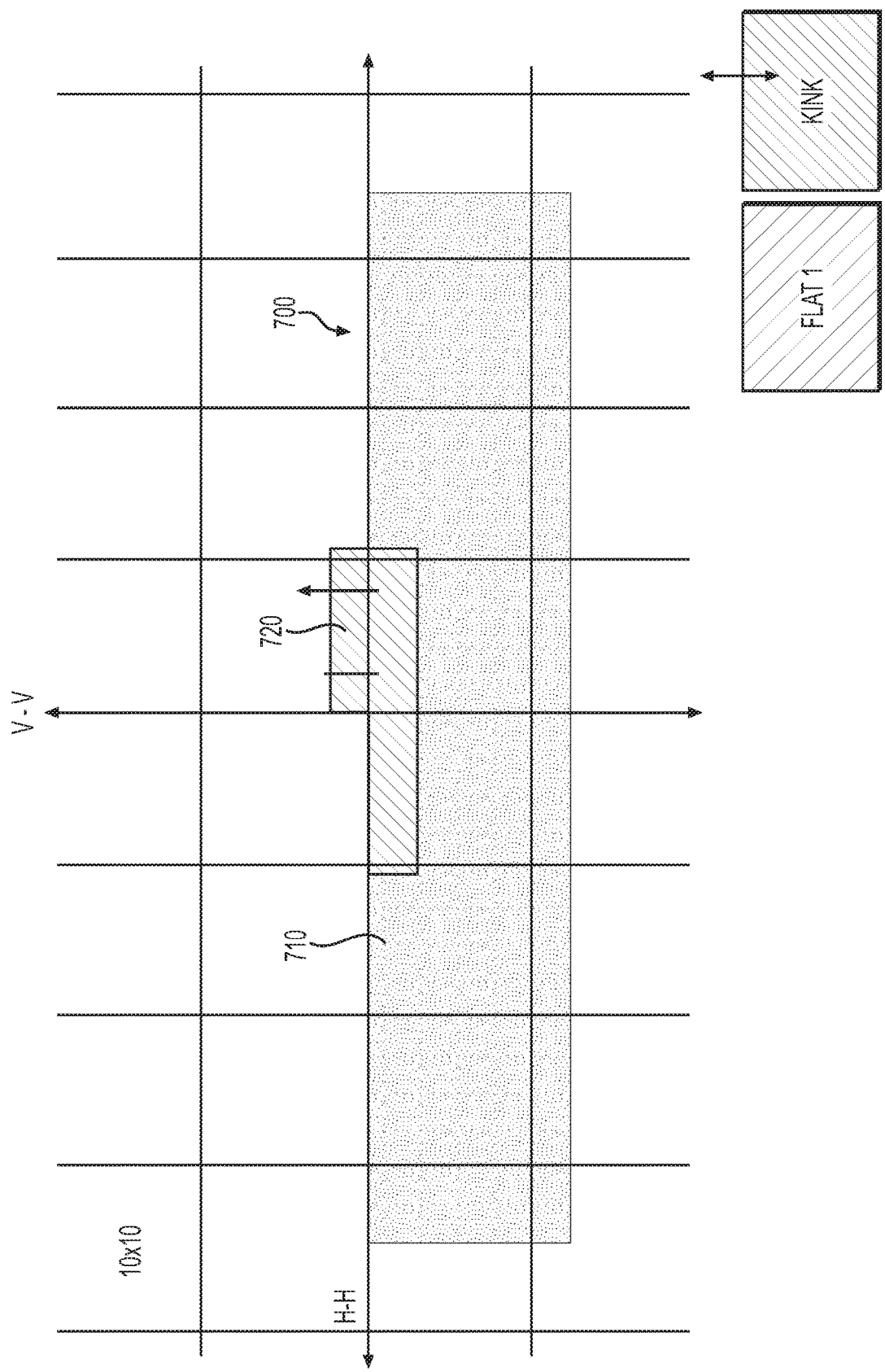

FIG. 7B illustrates the exemplary light fields of the low beam headlamp of FIG. 7A with the light fields redistributed by dynamic aiming, such as for when the vehicle speed exceeds a speed threshold. As illustrated in the figure, the kink component has been rotated or otherwise displaced to raise the kink light field upwards by 0.2°. This increases the forward reach of the low beam headlamp while conforming to FMVSS No. 108. The combined light field 700 illustrated in FIG. 7B conforms to a second illumination profile that might be activated when a vehicle in which the headlamp is installed is greater than the threshold speed.

Figure 8A:
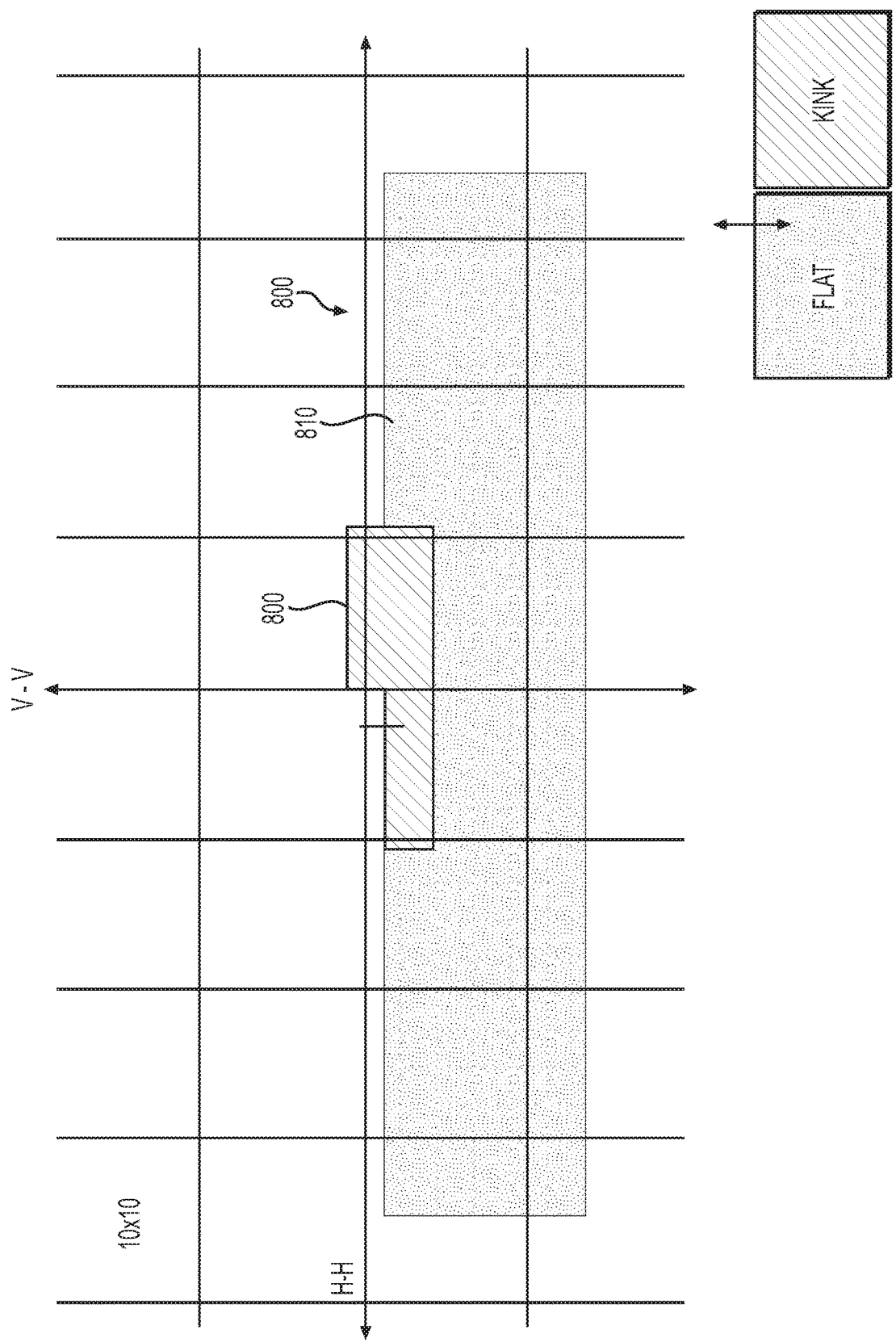
FIGS. 8A-8B are diagrams of exemplary light fields of a low beam headlamp according to embodiments of the present inventive concept.

FIG. 8A illustrates exemplary light fields of a low beam headlamp as seen or measured on the screen described above. In the example illustrated, light field 810 is generated by a flat component and light field 820 is generated by a kink component. The combined light fields are properly aligned on the grid, and hence in the vehicle, in accordance with visually optical left (VOL) alignment criteria (a VOL headlamp has a light gradient or cutoff in the beam pattern located 1.5°-3.5° left of the headlamp vertical axis and 0.4° below the horizontal axis of the headlamp.). The combined light field 800 illustrated in FIG. 8A conforms to a first illumination profile, such as might be activated when a vehicle in which the headlamp is installed is less than a vehicle speed threshold.

Figure 8B:
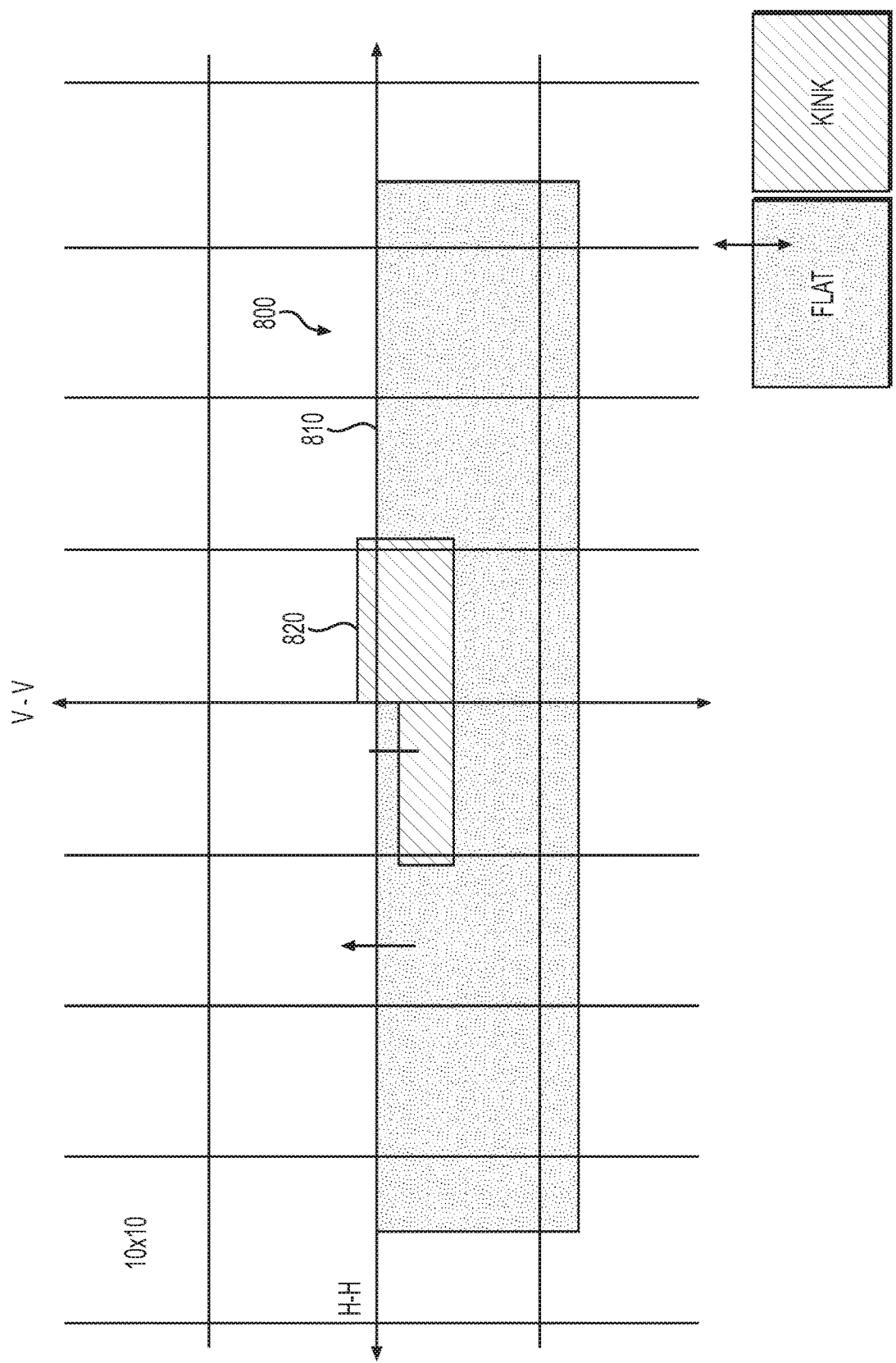

FIG. 8B illustrates the exemplary light fields of the low beam headlamp of FIG. 8A with the light fields redistributed by dynamic aiming. As illustrated in the figure, the flat component has been rotated or otherwise displaced to raise the flat light field upwards by 0.4°. This increases the forward reach of the low beam headlamp while conforming to FMVSS No. 108. The combined light field 800 illustrated in FIG. 8B conforms to a second illumination profile that might be activated when a vehicle in which the headlamp is installed is greater than the threshold speed.

Figure 9A:
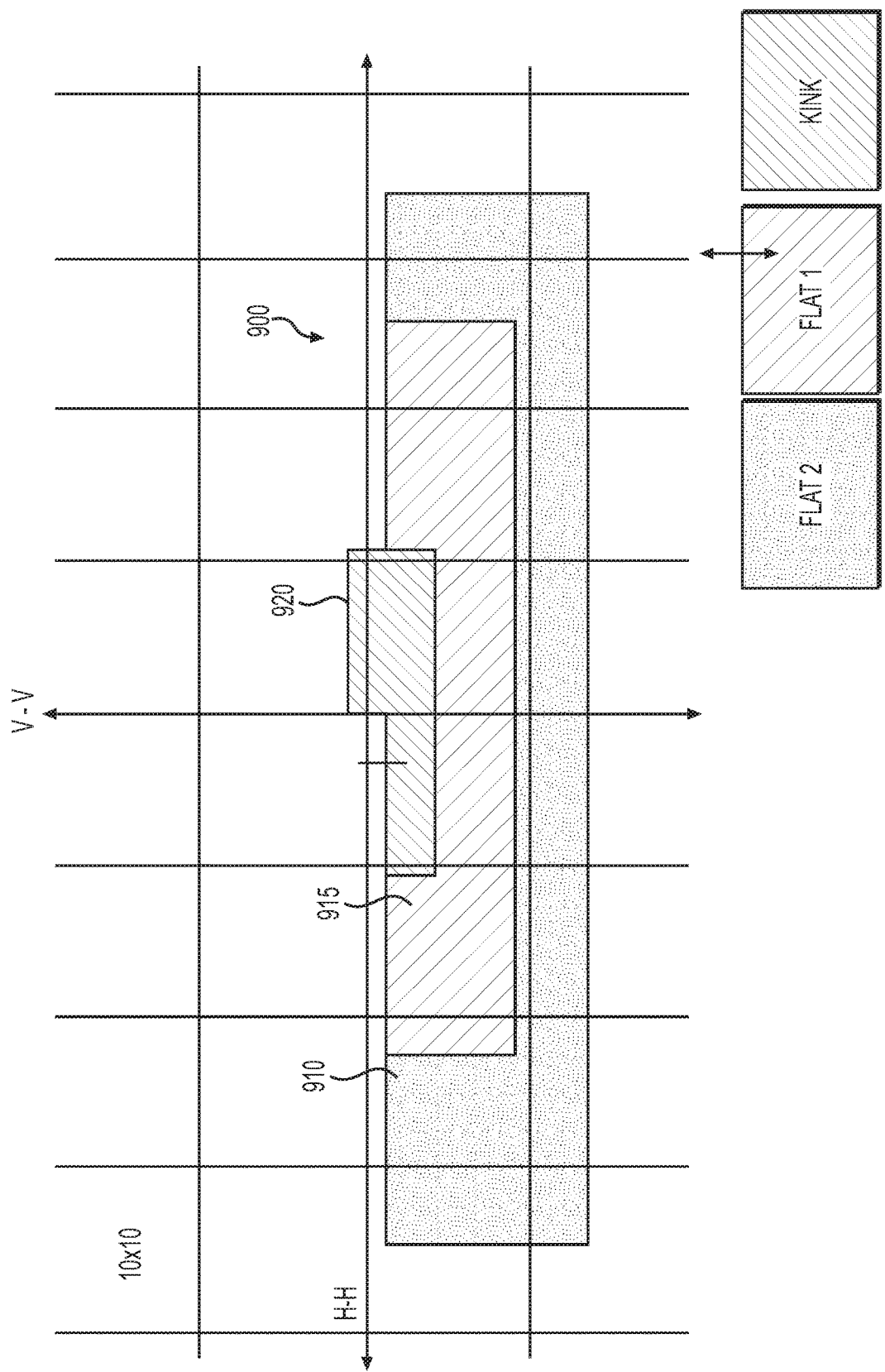

FIG. 9A illustrates exemplary light fields of a low beam headlamp as seen or measured on the screen described above. In the example illustrated, light field 910 is generated by a flat component, light field 915 is generated by another flat component and light field 920 is generated by a kink component. The combined light fields are properly aligned on the grid, and hence in the vehicle, in accordance with VOL alignment criteria. The combined light field 800 illustrated in FIG. 9A conforms to a first illumination profile, such as might be activated when a vehicle in which the headlamp is installed is less than a vehicle speed threshold.

FIG. 9B illustrates the exemplary light fields of the low beam headlamp of FIG. 9A with the light fields redistributed by dynamic aiming. As illustrated in the figure, one of the flat components has been rotated or otherwise displaced to raise the corresponding flat light field 915 upwards by 0.4°. This increases the forward reach of the low beam headlamp while conforming to FMVSS No. 108. The combined light field 900 illustrated in FIG. 9B conforms to a second illumination profile that might be activated when a vehicle in which the headlamp is installed is greater than the threshold speed.

Figure 10A:
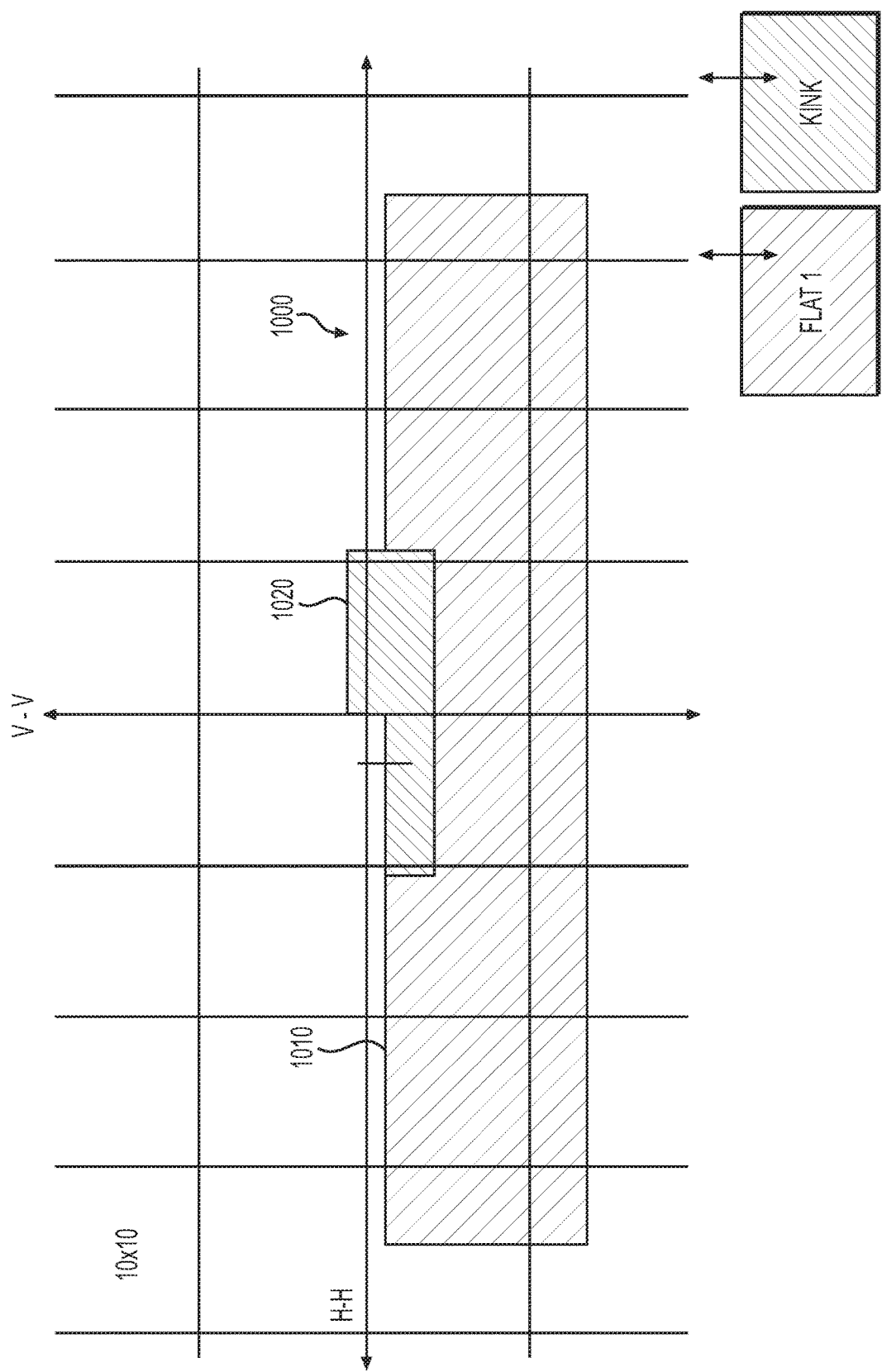

FIG. 10A illustrates exemplary light fields of a low beam headlamp as seen or measured on the screen described above. In the example illustrated, light field 1010 is generated by a flat component and light field 1020 is generated by a kink component. The combined light fields are properly aligned on the grid, and hence in the vehicle, in accordance with VOL alignment criteria. The combined light field 1000 illustrated in FIG. 10A conforms to a first illumination profile, such as might be activated when a vehicle in which the headlamp is installed is less than a vehicle speed threshold.

FIG. 10B illustrates the exemplary light fields of the low beam headlamp of FIG. 10A with the light fields redistributed by dynamic aiming. As illustrated in the figure, the flat component has been rotated or otherwise displaced to raise flat light field 1010 upwards by 0.4° and the kink component has been rotated or otherwise displaced to lower kink light field 1020 downwards by 0.2°. The combined light field 1000 illustrated in FIG. 10B conforms to a second illumination profile that might be activated when a vehicle in which the headlamp is installed is greater than the threshold speed.

Figure 11:
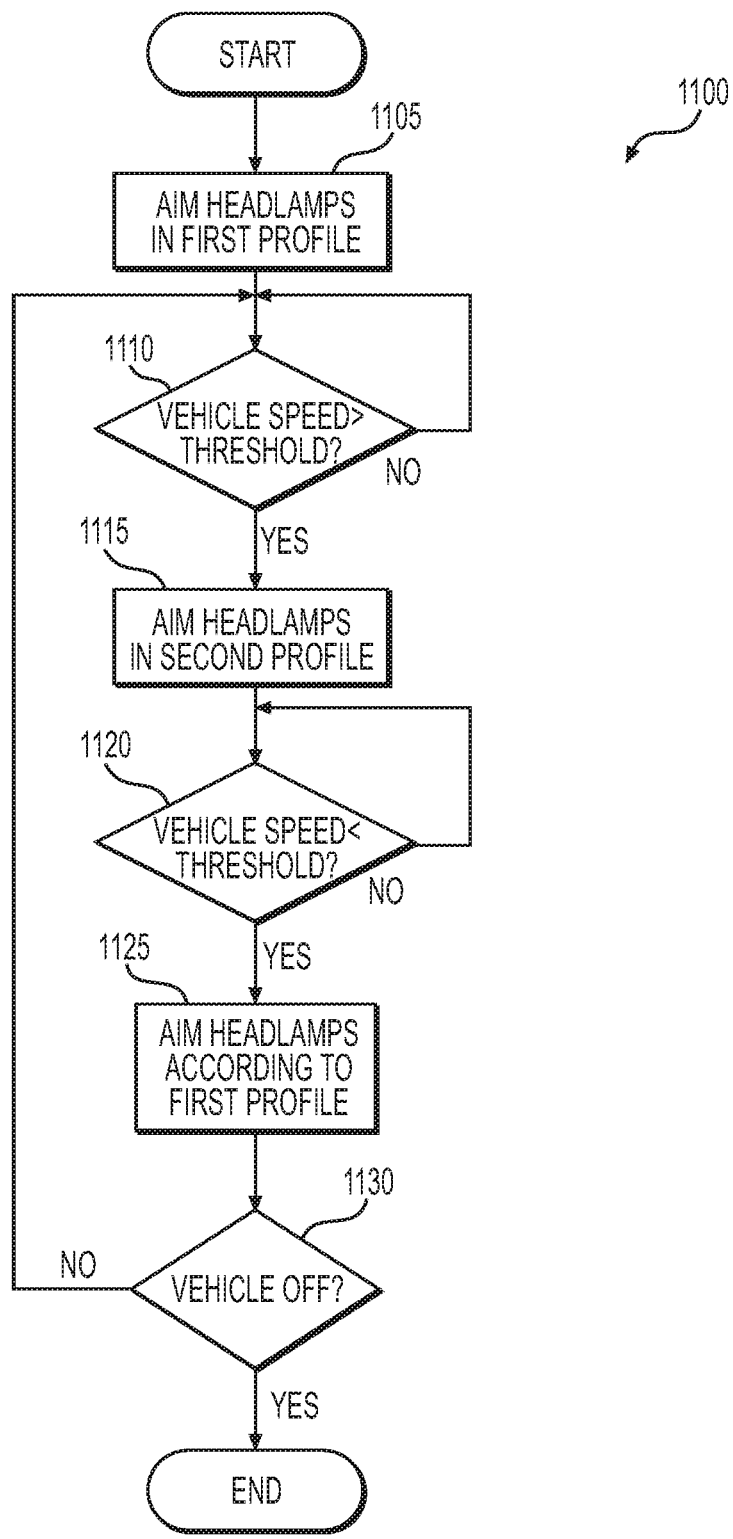
FIG. 11 is a flow diagram of an exemplary automotive lighting process 900 by which the present inventive concept can be embodied.

FIG. 11 is a flow diagram of an exemplary automotive lighting process 1100 by which the present invention can be embodied. In operation 1105, one or more headlamps are aimed or otherwise configured to conform to a first illumination profile. Such first illumination profile may be activated while the vehicle in which the headlamp is installed is traveling at a speed less than a vehicle threshold speed. Process 1100 may transition to operation 1110, by which is determined whether the vehicle speed is greater than the vehicle speed threshold. If so, process 1100 may transition to operation 1115, by which the headlamps may be aimed or otherwise configured to conform to a second illumination profile. Process 1100 may transition to operation 1120, by which it is determined whether the vehicle speed is less than the vehicle speed threshold and, if so, process 1100 may transition to operation 1125, by which the headlamps are returned to the first illumination profile. In operation 1130, it is determined whether the vehicle has been turned off. If not, process 1100 transitions to operation 1110 and continues from that point. Otherwise, if the vehicle has been turned off, process 1100 terminates.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of any means or step plus function elements in the claims below are intended to include any structure, material, or act for performing the function in combination with other claimed elements as specifically claimed. The embodiments disclosed herein were chosen and described in order to best explain the principles of the invention and the practical application, and to enable others of ordinary skill in the art to understand the invention for various embodiments with various modifications as are suited to the particular use contemplated.

The description of the present invention has been presented for purposes of illustration and description, but is intended to be neither exhaustive nor limited to the invention in the form disclosed. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

The invention claimed is:

1. An automotive lighting apparatus comprising:
   at least two lighting components to generate a light field, the at least two lighting components configured to be aligned such that the light field conforms to a first illumination profile having a cutoff region that meets a first cutoff criterion,
   where the at least two lighting components include a flat component configured to produce a first beam having a flat cutoff and includes a kink component configured to produce a second beam having an angled cutoff;
   at least one actuator mechanically coupled to the at least two lighting components that are configured to aim the at least two lighting components in a direction other than an initial direction in which the at least two lighting components are aligned, wherein the direction other than the initial direction that the at least two lighting components are configured to aim a displacement of the light field along a vertical axis by up to 0.2 degree of a beam field resolution; and
   a control component configured to operate the at least one actuator based on a speed of an automobile where the at least two lighting components are installed,
   where the at least one actuator is configured to aim the at least two lighting components in same said direction such that the light field of the second beam exclusive to the first beam also conforms to a second illumination profile that meets a second cutoff criterion.

2. The automotive lighting apparatus of claim 1, wherein the at least two lighting components conform to the first illumination profile meeting the first cutoff criterion while the speed of the automobile is less than a threshold speed and the at least two lighting components conform to the second illumination profile meeting the second cutoff criterion while the speed of the automobile is greater than the threshold speed.

3. The automotive lighting apparatus of claim 2, wherein the threshold speed is 30 miles per hour.

4. An automobile comprising:
   at least two lighting components to generate a light field, the at least two lighting components configured to be aligned such that the light field conforms to a first illumination profile having a cutoff region that meets a first cutoff criterion,
   where the at least two lighting components include a flat component configured to produce a first beam having a flat cutoff and includes a kink component configured to produce a second beam having an angled cutoff;
   at least one actuator mechanically coupled to the at least two lighting components that are configured to aim the at least two lighting components in a direction other than an initial direction in which the at least two lighting components are aligned, wherein the direction other than the initial direction that the at least two lighting components are configured to aim a displacement of the light field along a vertical axis upwards up to 0.4 degree of a beam field resolution; and
   a control component configured to operate the at least one actuator based on a speed of the automobile, where the at least one actuator is configured to aim the at least two lighting components in same said direction such that the light field of the second beam, exclusive to the first beam, also conforms to a second illumination profile that meets a second cutoff criterion.

5. The automobile of claim 4, wherein the at least two lighting components conform to the first illumination profile meeting the first cutoff criterion while the speed of the automobile is less than a threshold speed and the at least two lighting component conform to the second illumination profile meeting the second cutoff criterion while the speed of the automobile is greater than the threshold speed.

6. The automobile of claim 5, wherein the threshold speed is 30 miles per hour.

7. A method of automotive lighting comprising:
   aiming at least two lighting components that generate a light field, the at least two lighting components being aligned such that the light field conforms to a first illumination profile having a first cutoff region that meets a first cutoff criterion, where the at least two lighting components include a flat component configured to produce a first beam having a flat cutoff and includes a kink component configured to produce a second beam having an angled cutoff, wherein the direction other than the initial direction that the at least two lighting components are aimed with a displacement of the light field along a vertical axis by up to 0.4 degree of a beam field resolution; and aiming the at least two lighting components in response to a command issued by a controller in the same direction such that the light field of the second beam, exclusive to the first beam, conforms to a second illumination profile that meets a second cutoff criterion, the command indicating a speed of an automobile where the at least two lighting components are installed, such that the light field of the at least two lighting components also conforms to the second illumination profile that meets the second cutoff criterion.

8. The method of claim 7, further comprising:

aiming the at least two lighting components to conform to the first illumination profile meeting the first cutoff criterion while the speed of the automobile is less than a threshold speed; and aiming the at least two lighting components to conform to the second illumination profile meeting the second cutoff criterion while the speed of the automobile is greater than the threshold speed.

9. The method of claim 8, wherein the threshold speed is 30 miles per hour.

* * * * *